US012767060B2

(12) United States Patent
Bertrand et al.

(10) Patent No.: US 12,767,060 B2

(45) Date of Patent: Oct. 20, 2026

(54) VEHICLE ROOFTOP SLIDING CARRIER FOR SPORTS EQUIPMENT

(71) Applicants: Jean Bertrand, Rosemère (CA); Ginette Roy, Rosemère (CA)

(72) Inventors: Jean Bertrand, Rosemère (CA); Ginette Roy, Rosemère (CA)

( * ) Notice: Subject to any disclaimer, the term of this patent is extended or adjusted under 35 U.S.C. 154(b) by 306 days.

(21) Appl. No.: 18/367,482

(22) Filed: Sep. 13, 2023

(65) Prior Publication Data

US 2024/0083367 A1 Mar. 14, 2024

(30) Foreign Application Priority Data

Sep. 13, 2022 (GB) ..................................... 2213360

(51) Int. Cl.
*B60R 9/08* (2006.01)

(52) U.S. Cl.
CPC ..................................... *B60R 9/08* (2013.01)

(58) Field of Classification Search
CPC . B60R 9/042; B60R 9/08; B60R 9/045; B60P 3/1025
See application file for complete search history.

(56) References Cited

U.S. PATENT DOCUMENTS

| | | | | |
|---|---|---|---|---|
| 2,446,092 | A | 7/1948 | Lait | |
| 2,624,497 | A | 1/1953 | Newman | |
| 2,765,940 | A | 10/1956 | Nelson | |
| 3,193,124 | A | 7/1965 | Essling | |
| 3,452,893 | A | 7/1969 | Heflin | |
| 3,460,694 | A | 8/1969 | Simms | |
| 3,462,157 | A | 8/1969 | Barnett et al. | |
| 3,480,166 | A | 11/1969 | Abbott | |
| 4,058,243 | A | 11/1977 | Tappan | |
| 4,081,095 | A | 3/1978 | Wilburn et al. | |
| 4,446,998 | A | 5/1984 | Taig | |
| 5,417,358 | A | 5/1995 | Haseigrove | |
| 5,505,579 | A | 4/1996 | Ray et al. | |
| 5,904,463 | A * | 5/1999 | Christensen | B60R 9/00 224/310 |
| 6,827,244 | B1 * | 12/2004 | Stapleton | B60R 9/042 224/310 |
| 7,780,050 | B2 | 8/2010 | Tucker | |
| 10,059,273 | B1 * | 8/2018 | Mercurio | B60R 9/045 |
| 2011/0042432 | A1 | 2/2011 | Elezaj | |
| 2014/0252056 | A1 | 9/2014 | Murray et al. | |
| 2019/0232854 | A1 | 8/2019 | Frost | |

* cited by examiner

*Primary Examiner* — Corey N Skurdal

(57) ABSTRACT

The present invention provides a vehicle rooftop sliding carrier designed for enhanced cargo transportation, such as sports equipment. The carrier comprises a fixed frame configured for attachment to a vehicle roof, featuring longitudinal members. A sliding frame is installed atop the fixed frame and is designed to slide rearwardly relative to the vehicle. This sliding frame includes its own longitudinal members parallel to those of the fixed frame. A set of casters is situated on the sliding frame's longitudinal members to facilitate rearward sliding relative to the fixed frame. Notably, the sliding frame is narrower than the fixed frame, allowing the casters to roll within the interior of the fixed frame's longitudinal members. Additionally, cargo attachments are incorporated into the sliding frame for secure cargo placement.

7 Claims, 8 Drawing Sheets

FIG. 8A
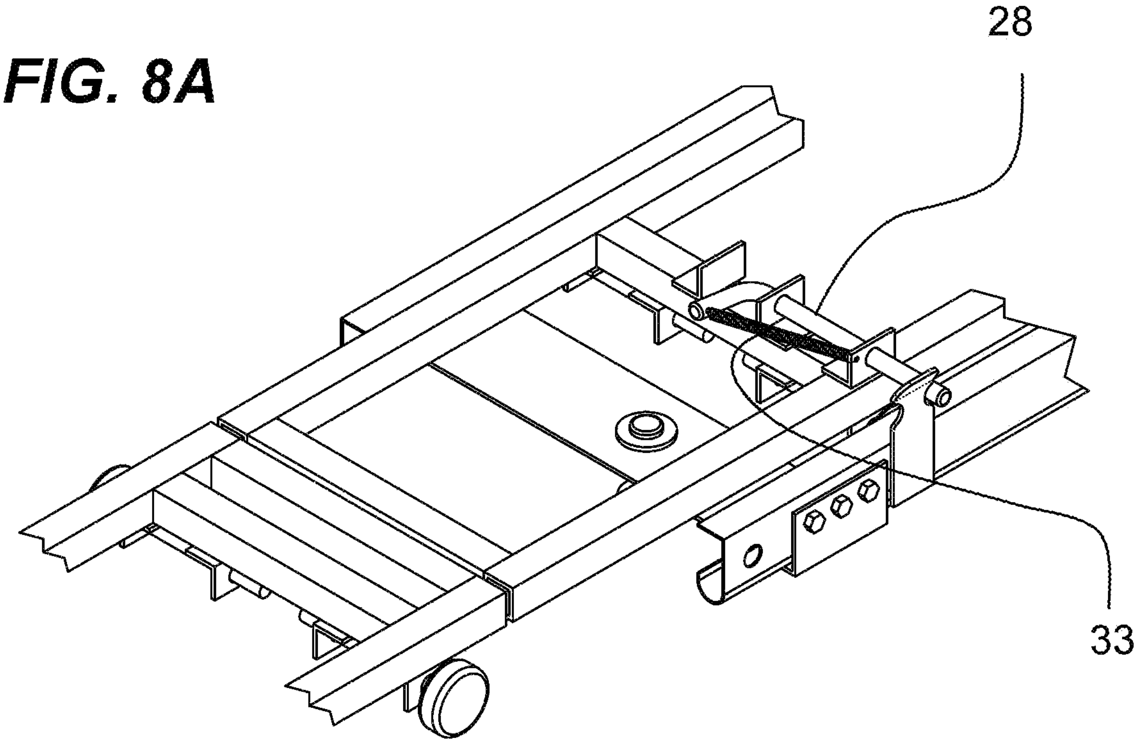
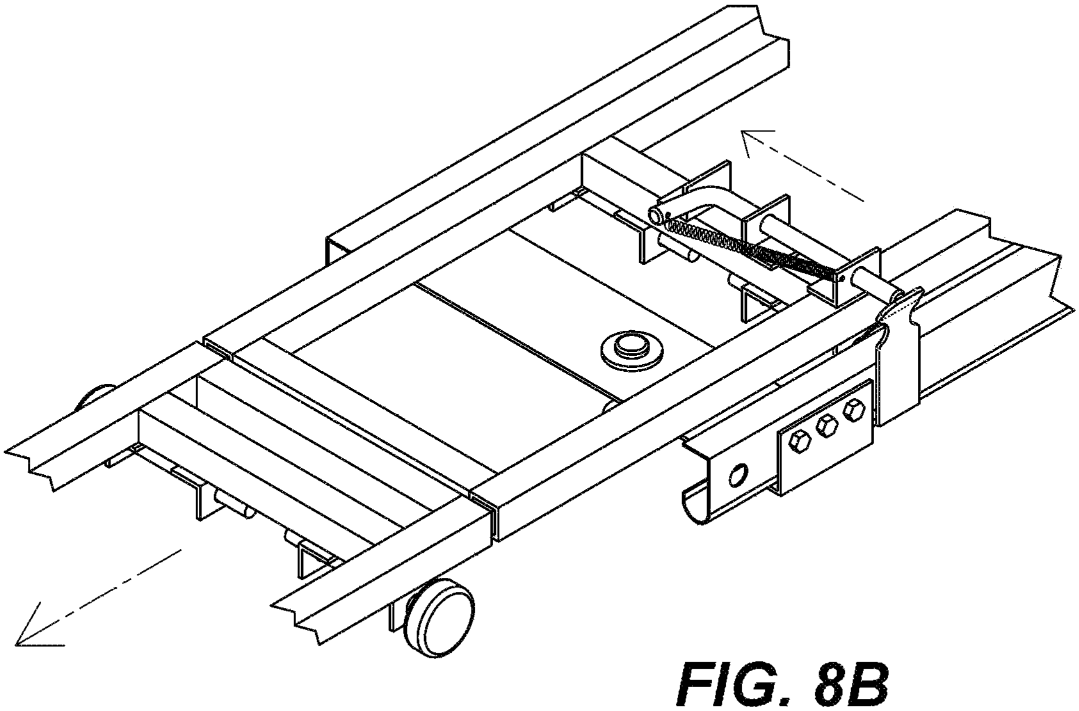
FIG. 8B

VEHICLE ROOFTOP SLIDING CARRIER FOR SPORTS EQUIPMENT

CROSS-REFERENCE TO RELATED APPLICATIONS

The present application claims priority to UK request GB22133603.7 filed on Sep. 13, 2022 which is hereby incorporated in its entirety at least by reference.

BACKGROUND OF THE INVENTION

1. Field of the Invention

The present invention relates generally to cargo carriers but more particularly to a vehicle rooftop sliding carrier for sports equipment.

2. Description of Related Art

The roof of a vehicle serves as a versatile platform for storing, holding, and transporting cargo, such as sports equipment and related cargo, that is either too large or otherwise unsuitable for placement within the vehicle's interior. Over the years, a variety of rooftop racks have been developed to facilitate this need.

Rooftop racks can be broadly categorized into two types: general-purpose racks and special-purpose racks. General-purpose racks are designed for carrying a wide range of items, while special-purpose racks are tailored for specific activities such as transporting skis, bicycles, kayaks, surfboards, paddleboards, and the like.

Despite the availability of these rack types, there are inherent limitations in their design and functionality. For instance, general-purpose racks may lack specialized features for securely holding specific types of cargo, while special-purpose racks may not be versatile enough for multiple uses.

Several patents, including U.S. Pat. Nos. 2,446,092, 2,624,497, and 3,460,694, as well as French Patent FR2600953, describe rooftop supports comprising a fixed section and a movable section. The movable section is equipped with wheels or other means of displacement and features a pivoting or perpendicular support bar.

Additional patents, such as U.S. Pat. Nos. 2,765,940, 3,193,124, 3,452,893, 3,480,166, 3,462,157, 4,446,998, and 5,417,358, along with British Patent GB2118501, also describe rooftop supports with fixed and movable sections. These patents further introduce the concept of a tiltable movable section to ease the loading process. Some even incorporate a winch system or motorized mechanism to assist in moving the movable section.

While these prior art references provide various solutions for rooftop cargo transportation, there remains a need for an improved rooftop rack system that addresses the limitations of existing designs, offering both versatility and specialized functionality.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The primary objective of the present invention is to revolutionize the way cargo, such as sports equipment, is transported on vehicle rooftops by introducing a sliding carrier with enhanced features. This invention aims to significantly improve user experience by enabling easy loading and unloading through an extendable sliding frame. It also seeks to enhance cargo security during transit with a robust locking mechanism and specialized cargo attachments. Furthermore, the invention prioritizes user-friendly operation by incorporating a telescopic pull handle and ensures a secure and stable attachment to the vehicle roof through the use of clamps and padded footings. Overall, the invention aims to offer a versatile, secure, and convenient solution for rooftop cargo transportation.

In order to do so, a vehicle rooftop sliding carrier is provided, comprising a fixed frame configured to attach to a vehicle roof, the fixed frame including longitudinal members; a sliding frame installed atop the fixed frame and configured to slide rearwardly relative to the vehicle, the sliding frame including longitudinal members parallel to the fixed frame longitudinal members; a plurality of casters located on the sliding frame longitudinal members for sliding the sliding frame rearwardly relative to the fixed frame; a stopper and pin for stopping rearward sliding of the sliding frame relative to the fixed frame; and, cargo attachments located on the sliding frame for securing cargo to the sliding frame.

In one embodiment, the sliding frame is extendable from a rear of the fixed frame and the vehicle to provide loading and unloading of cargo onto and from the sliding frame. In one embodiment, a locking pin and holes for releasably locking the sliding frame in place relative to the fixed frame is provided. In one embodiment, a telescopic pull handle on a rear of the sliding frame for extending the sliding frame rearwardly is provided. In one embodiment, clamps for attaching the fixed frame to the vehicle roof are provided. In another embodiment, the sliding frame includes hinges for pivoting a front portion of the sliding frame relative to a rear portion, such that the front portion can remain within the fixed frame while the rear portion pivots downward. In one embodiment, padded footings for supporting the fixed frame on the vehicle roof are provided. In yet another embodiment, a securing attachment is provided for preventing cargo from sliding during loading and unloading.

The foregoing has outlined rather broadly the more pertinent and important features of the present invention so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

Other features and advantages of the present invention will become apparent when the following detailed description is read in conjunction with the accompanying drawings, in which:

FIG. 8A is an isometric view showing the pin in locked mode.

FIG. 8B is an isometric view showing the pin in an unlocked mode.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a vehicle rooftop sliding carrier for sports equipment.

It is to be understood that the terminology used herein is for the purpose of describing particular embodiments only and is not intended to be limiting. The terms "a" or "an," as used herein, are defined to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figures 1A, 1B:
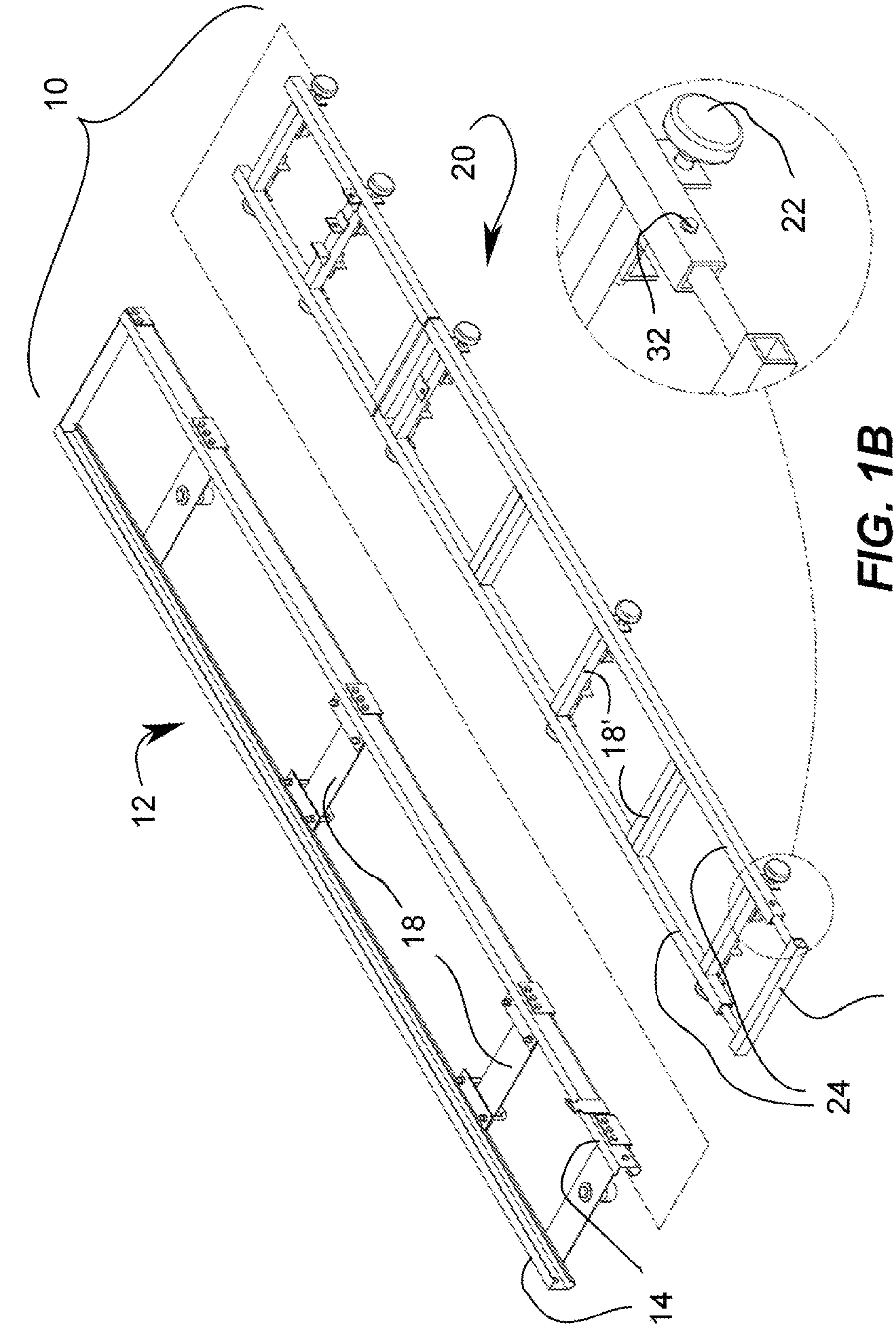
FIG. 1A is an isometric exploded view of a vehicle rooftop sliding carrier for sports equipment according to an embodiment of the present invention.
FIG. 1B is a detailed view of FIG. 1A illustrating the pull handle.
Figures 2A, 2B:
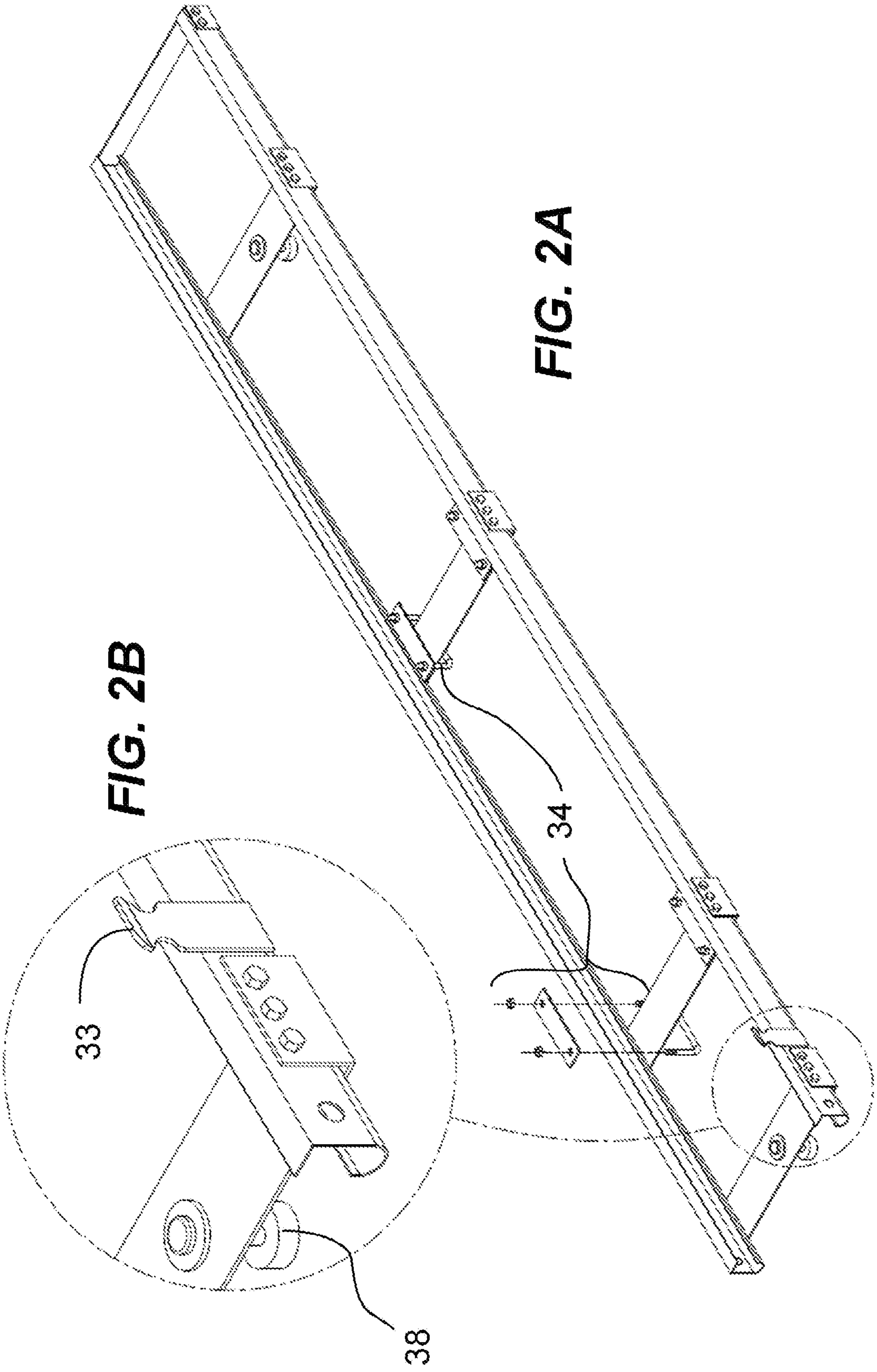
FIG. 2A is an isometric view of the fixed frame according to an embodiment of the present invention.
FIG. 2B is a detailed view of FIG. 2A illustrating an end portion of the fixed frame.
Figures 3A, 3B, 3C:
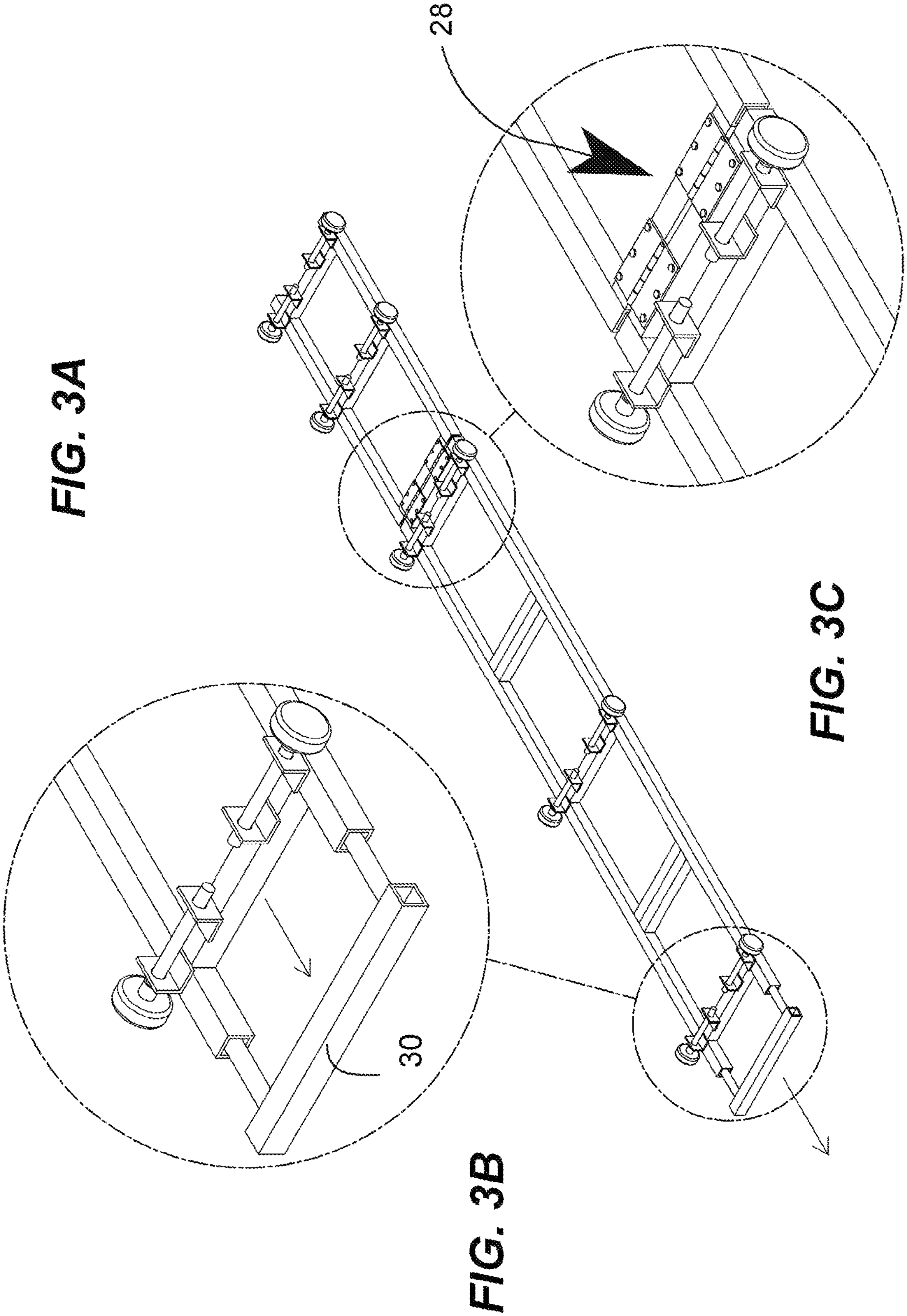
FIG. 3A is an isometric view of sliding frame according to an embodiment of the present invention.
FIG. 3B is a detailed view of FIG. 3A illustrating a first end of the sliding frame.
FIG. 3C is a detailed view of FIG. 3A illustrating a second end of the sliding frame.
Figures 4A, 4B:
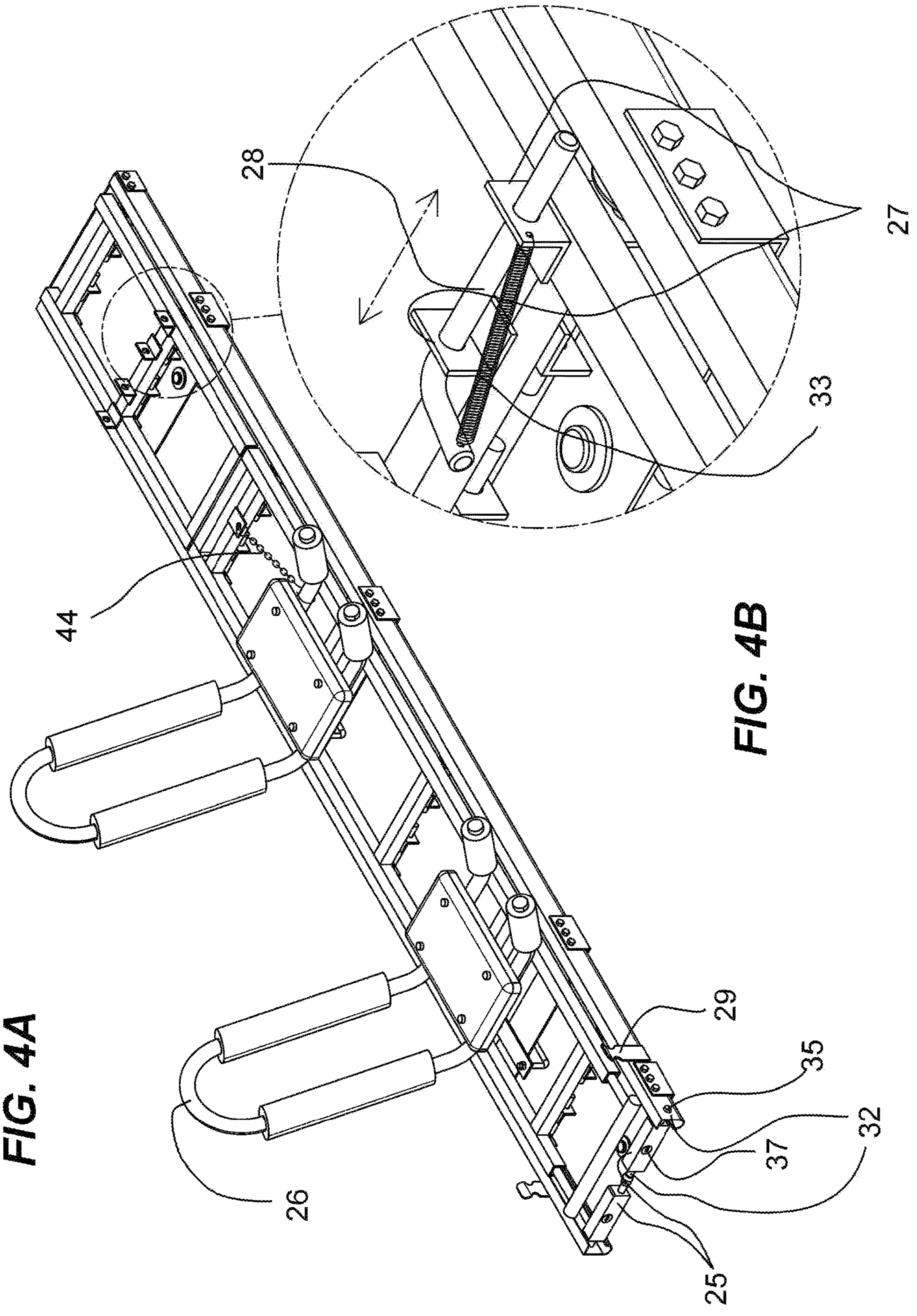
FIG. 4A is an isometric view of the vehicle rooftop sliding carrier with a specific attachment.
FIG. 4B is a detailed view of FIG. 4A.
Figures 5A, 5B:
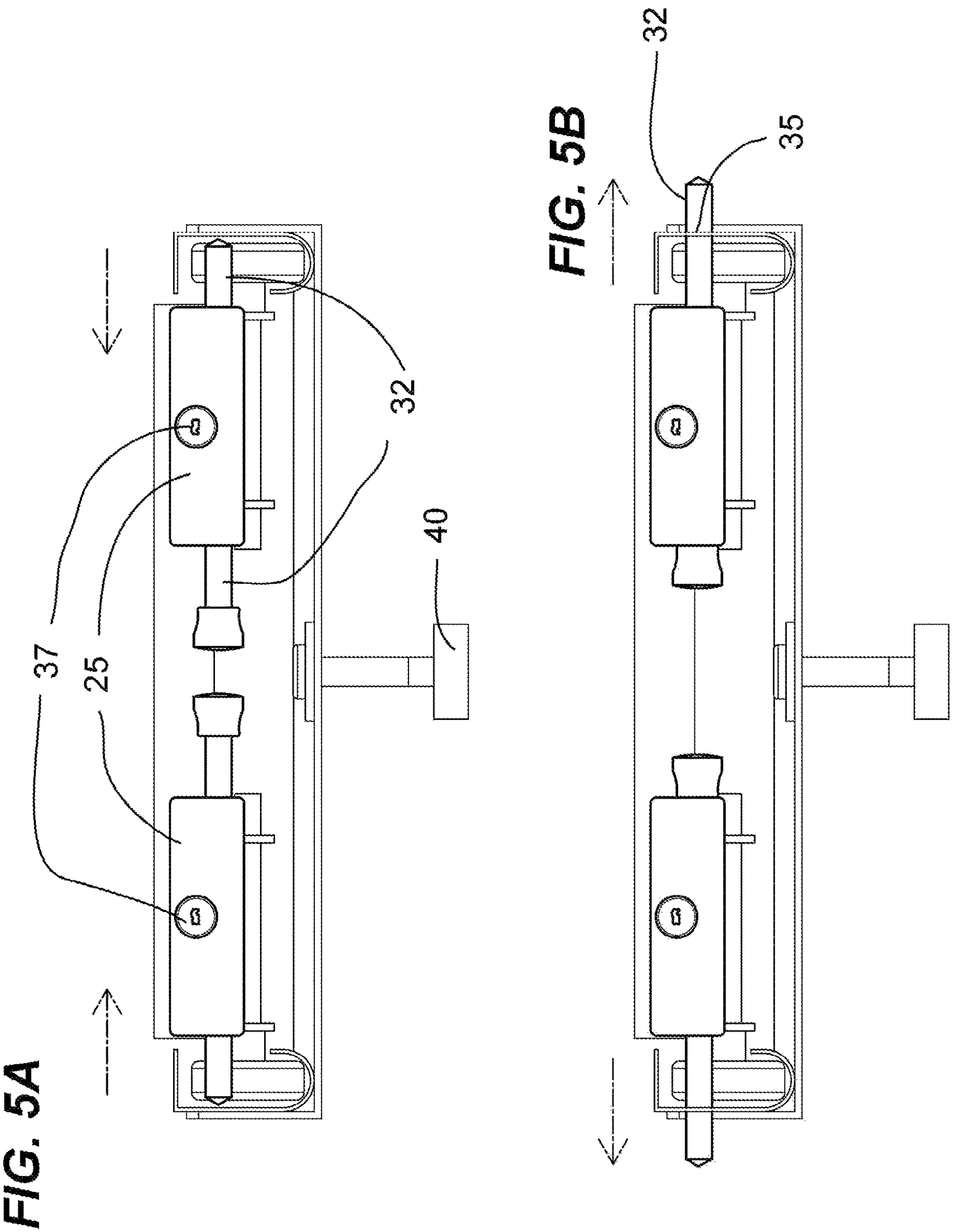
FIG. 5A is a front view of the lockable latches in an unlocked position.
FIG. 5B is a front view of the lockable latches in a locked position.
Figures 6A, 6B:
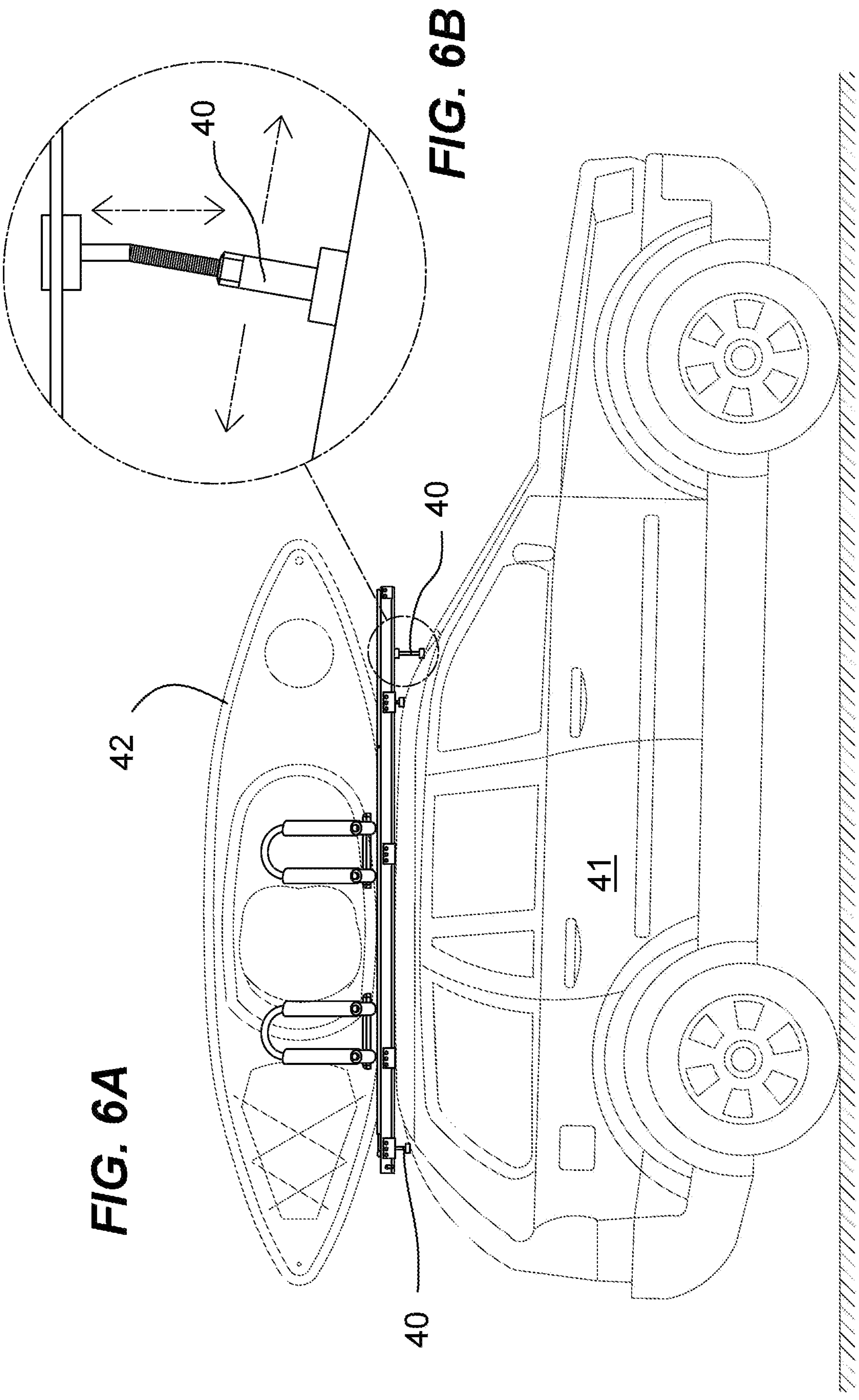
FIG. 6A is a side view of the vehicle rooftop sliding carrier installed on the roof of a vehicle according to an embodiment of the present invention.
FIG. 6B is a detailed view of FIG. 6A illustrating the padded footing.
Figure 7A:
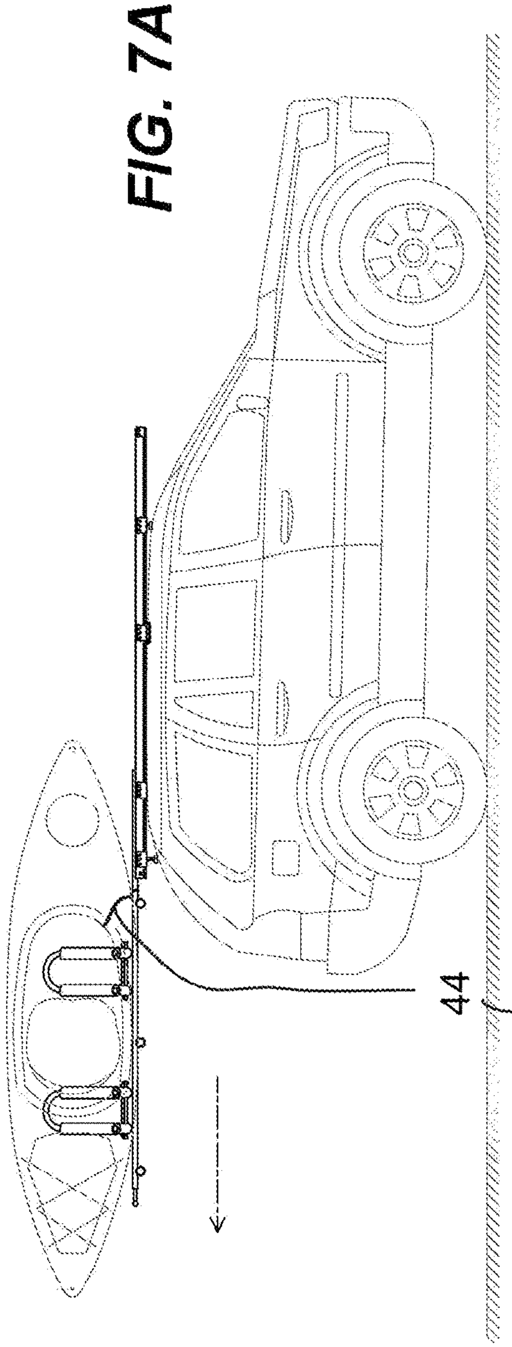
FIG. 7A is a side view showing a first configuration of the present invention.
Figure 7B:
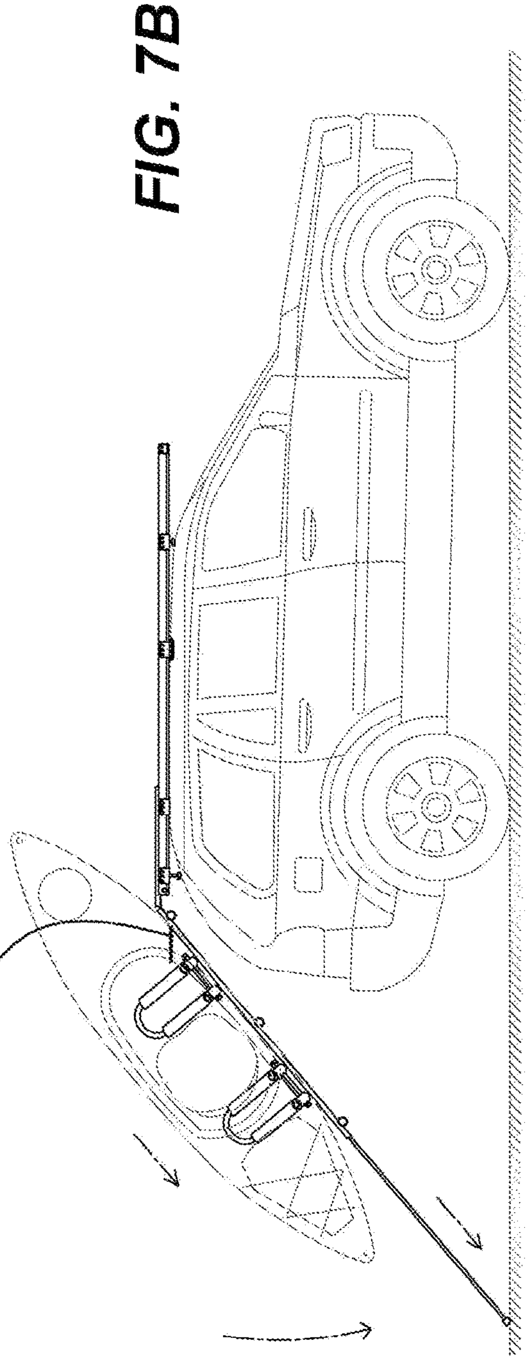
FIG. 7B is a side view showing a second configuration of the present invention.

Referring now to any of the accompanying FIGS. 1-8B, a vehicle rooftop sliding carrier 10 for sports equipment is illustrated. In one embodiment, the vehicle rooftop sliding carrier 10 comprises a fixed frame 12 designed to attach to a vehicle roof. The fixed frame includes longitudinal members 14. Sports Utility Vehicles 41 often have a built-in roof rack 18, serving as a framework for third-party equipment racks like the sliding carrier 10.

In some embodiments, installed atop the fixed frame 12 is a sliding frame 20. This frame is designed to slide rearwardly relative to the vehicle 16. The sliding frame includes longitudinal members 24 that run parallel to those of the fixed frame 14.

In some embodiments, the sliding frame 20 is extendable from the rear of the fixed frame 12 and the vehicle 16. This feature facilitates the loading and unloading of cargo onto the sliding frame 20. The sliding frame includes cargo-specific attachments 26, which can be customized based on the type of cargo, such as sports equipment.

In one embodiment, a stopper 31 and pin 28 mechanism control the rearward movement of the sliding frame 20. The pin 28 is held in place by "L" brackets 27 and is biased by a means for biasing 33. This allows the sliding frame 20 to be removed from the fixed frame 12 for various purposes, such as maintenance or installing cargo-specific attachments 26.

In some embodiments, the sliding frame 20 can be locked in place by locking pins 32 that engage into holes 35. These pins can be key-lockable by locks 37 located on locking blocks 25. A telescopic pull handle 30 is located at the rear of the sliding frame 20 to assist in extending it rearwardly.

In one embodiment, a set of four "C" clamps 34 attach the fixed frame to the vehicle's roof. These clamps secure the fixed frame's transverse roof rack members 18" to the vehicle's own transverse roof rack members 18.

In some embodiments, the sliding frame 20 features a set of hinges 36 that allow a front portion 38 to remain within the fixed frame 12 while allowing the rear portion to pivot downwardly. When fully pulling out the telescopic pull handle 30, it clears an opened rear hatch 31 such that the sliding frame 20 can be pulled out without interference. Padded footings 40 offer additional support for the fixed frame 12 on the vehicle's roof. To prevent cargo, such as a kayak 42, from sliding during the loading and unloading process, a securing attachment 44 is provided.

Although the invention has been described in considerable detail in language specific to structural features, it is to be understood that the invention defined in the appended claims is not necessarily limited to the specific features described. Rather, the specific features are disclosed as exemplary forms of implementing the claimed invention. The terminology and phraseology used in this description and the abstract are for illustrative purposes and should not be considered as limiting. In other words, the terminology and phraseology used in this description and the abstract are for illustrative purposes and should not be considered limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to “first,” “second,” “third,” and so fourth members throughout the disclosure (and in particular, claims) are not used to show a serial or numerical limitation but instead are used to distinguish or identify the various members of the group.

What is claimed is:

1. A vehicle rooftop sliding carrier comprising:

a fixed frame configured to attach to a vehicle roof, the fixed frame including longitudinal members;

a sliding frame installed atop the fixed frame and configured to slide rearwardly relative to the vehicle, the sliding frame including longitudinal members parallel to the fixed frame longitudinal members;

a plurality of casters located on the sliding frame longitudinal members for sliding the sliding frame rearwardly relative to the fixed frame;

a stopper and pin for limiting rearward sliding of the sliding frame relative to the fixed frame when the sliding frame is fully extended;

a locking mechanism separate from the stopper and pin, the locking mechanism comprising a pair of locking blocks carried by the sliding frame, each locking block of the pair of locking blocks having a laterally movable locking pin, each locking pin being movable between an engaged position in which the locking pin extends laterally outward into a corresponding hole formed in the fixed frame and a disengaged position in which the locking pin is withdrawn from the corresponding hole, wherein each locking block of the pair of locking blocks further comprises a key-operable lock configured to selectively prevent movement of the locking pin, and the locking mechanism configured to lock the sliding frame in a fixed position relative to the fixed frame; and, cargo attachments located on the sliding frame for securing cargo to the sliding frame.

2. The vehicle rooftop sliding carrier of claim 1, wherein the sliding frame is extendable from a rear of the fixed frame and the vehicle to provide loading and unloading of cargo onto and from the sliding frame.

3. The vehicle rooftop sliding carrier of claim 1, further comprising a telescopic pull handle on a rear of the sliding frame for extending the sliding frame rearwardly.

4. The vehicle rooftop sliding carrier of claim 1, further comprising clamps for attaching the fixed frame to the vehicle roof.

5. The vehicle rooftop sliding carrier of claim 1, wherein the sliding frame includes hinges for pivoting a front portion of the sliding frame relative to a rear portion, such that the front portion can remain within the fixed frame while the rear portion pivots downward.

6. The vehicle rooftop sliding carrier of claim 1, further comprising padded footings for supporting the fixed frame on the vehicle roof.

7. The vehicle rooftop sliding carrier of claim 1, further comprising a securing attachment for preventing cargo from sliding during loading and unloading.

* * * * *